United States Patent
Beard et al.

(10) Patent No.: US 10,733,894 B1
(45) Date of Patent: Aug. 4, 2020

(54) DIRECT-BROADCAST REMOTE IDENTIFICATION (RID) DEVICE FOR UNMANNED AIRCRAFT SYSTEMS (UAS)

(71) Applicant: uAvionix Corporation, Bigfork, MT (US)

(72) Inventors: Paul Beard, Bigfork, MT (US); Christian Ramsey, Purcellville, VA (US)

(73) Assignee: UAVIONIX CORPORATION, Bigfork, MT (US)

( * ) Notice: Subject to any disclaimer, the term of this patent is extended or adjusted under 35 U.S.C. 154(b) by 32 days.

(21) Appl. No.: 15/905,340

(22) Filed: Feb. 26, 2018

Related U.S. Application Data

(63) Continuation-in-part of application No. 15/290,790, filed on Oct. 11, 2016, now Pat. No. 10,054,941, and
(Continued)

(51) Int. Cl.
| | |
|---|---|
| *G08G 5/00* | (2006.01) |
| *H04W 4/06* | (2009.01) |
| *G05D 1/00* | (2006.01) |
| *B64C 39/02* | (2006.01) |
| *G01C 5/06* | (2006.01) |
| *G01S 19/14* | (2010.01) |

(52) U.S. Cl.
CPC ......... *G08G 5/0013* (2013.01); *B64C 39/024* (2013.01); *G01C 5/06* (2013.01); *G01S 19/14* (2013.01); *G05D 1/0022* (2013.01); *G08G 5/003* (2013.01); *G08G 5/0026* (2013.01); *G08G 5/0043* (2013.01); *G08G 5/0078* (2013.01); *G08G 5/0091* (2013.01); *H04W 4/06* (2013.01); *B64C 2201/146* (2013.01)

(58) Field of Classification Search
CPC .... G08G 5/0013; G08G 5/003; G08G 5/0091; G08G 5/0043; G08G 5/0078; G08G 5/0026; H04W 4/06; G01C 5/06; G01S 19/14; B64C 39/024; B64C 2201/146; G05D 1/0022
USPC .......................................................... 701/3
See application file for complete search history.

(56) References Cited

U.S. PATENT DOCUMENTS

| | | |
|---|---|---|
| 5,475,705 A | 12/1995 | Dent |
| 6,891,906 B1 | 5/2005 | Sogabe et al. |

(Continued)

*Primary Examiner* — Brian P Sweeney
(74) *Attorney, Agent, or Firm* — Suiter Swantz pc llo

(57) ABSTRACT

A direct-broadcast remote identification (RID) device attachable to an unmanned aircraft system (UAS) encodes identifier signals based on a unique identifier of the UAS and position data, e.g., the current and originating (launch) positions of the UAS, and transmits encoded data signals receivable and decodable by specially configured receiver devices in range. The encoded identifier signals may be transmitted at low power via radio-control frequencies, whitespace frequencies, ISM frequencies, DME frequencies, or ADS-B frequencies as needed. The receiver devices may decode identifier signals to display the relative positions of, and information about, nearby UAS even in internet-denied areas (standalone mode). The receiver devices may retrieve additional data, such as operator information and flight plans, from remote databases by establishing wireless connections when said connections are available (connected mode).

11 Claims, 7 Drawing Sheets

Related U.S. Application Data a continuation-in-part of application No. 15/290,708, filed on Oct. 11, 2016, now Pat. No. 9,906,265, and a continuation-in-part of application No. 15/290,760, filed on Oct. 11, 2016, now abandoned, and a continuation-in-part of application No. 15/246,095, filed on Aug. 24, 2016, now abandoned.

(60) Provisional application No. 62/480,031, filed on Mar. 31, 2017, provisional application No. 62/395,900, filed on Sep. 16, 2016, provisional application No. 62/384,007, filed on Sep. 6, 2016, provisional application No. 62/242,082, filed on Oct. 15, 2015, provisional application No. 62/242,182, filed on Oct. 15, 2015, provisional application No. 62/239,016, filed on Oct. 8, 2015, provisional application No. 62/210,494, filed on Aug. 27, 2015, provisional application No. 62/209,221, filed on Aug. 24, 2015.

(56) References Cited

U.S. PATENT DOCUMENTS

| | | | |
|---|---|---|---|
| 7,391,359 | B2 | 6/2008 | Ootomo et al. |
| 7,471,235 | B2 | 12/2008 | Ootomo et al. |
| 7,570,214 | B2 | 8/2009 | Smith et al. |
| 7,706,979 | B1 | 4/2010 | Herwitz |
| 7,782,256 | B2 | 8/2010 | Smith |
| 7,961,136 | B2 | 6/2011 | Stefani et al. |
| 8,072,382 | B2 | 12/2011 | Smith et al. |
| 8,102,301 | B2 | 1/2012 | Mosher |
| 8,130,135 | B2 | 3/2012 | Donovan |
| 8,358,677 | B2 | 1/2013 | Collette et al. |
| 8,368,584 | B2 | 2/2013 | Askelson et al. |
| 8,373,591 | B2 | 2/2013 | Margolin |
| 8,378,881 | B2 | 2/2013 | LeMire et al. |
| 8,380,367 | B2 | 2/2013 | Schultz et al. |
| 8,386,175 | B2 | 2/2013 | Limbaugh et al. |
| 8,467,431 | B2 | 6/2013 | Park et al. |
| 8,955,110 | B1 | 2/2015 | Twitchell, Jr. |
| 9,129,520 | B2 | 9/2015 | Limbaugh et al. |
| 9,208,687 | B2 | 12/2015 | Wang et al. |
| 9,250,320 | B2 | 2/2016 | Watson et al. |
| 9,274,521 | B1 | 3/2016 | Stefani et al. |
| 9,305,280 | B1 | 4/2016 | Berg et al. |
| 9,325,407 | B2 | 4/2016 | Horvitz et al. |
| 9,405,005 | B1 | 8/2016 | Arteaga |
| 9,741,255 | B1 | 8/2017 | Navot et al. |
| 2005/0271125 | A1 | 12/2005 | Chedester et al. |
| 2006/0030994 | A1 | 2/2006 | Lai |
| 2010/0246492 | A1 | 9/2010 | Scarlatti et al. |
| 2010/0283661 | A1 | 11/2010 | Strain et al. |
| 2011/0162573 | A1 | 7/2011 | Race et al. |
| 2011/0189943 | A1 | 8/2011 | Ilarregui et al. |
| 2012/0001788 | A1 | 1/2012 | Carlson et al. |
| 2012/0038501 | A1 | 2/2012 | Schulte et al. |
| 2013/0009823 | A1 | 1/2013 | Wang |
| 2013/0099941 | A1 | 4/2013 | Jana et al. |
| 2014/0324255 | A1 | 10/2014 | Siddiqi et al. |
| 2015/0097714 | A1 | 4/2015 | Margolin |
| 2015/0236778 | A1 | 8/2015 | Jalali |
| 2015/0237569 | A1 | 8/2015 | Jalali |
| 2015/0260824 | A1 | 9/2015 | Malveaux |
| 2015/0331099 | A1 | 11/2015 | Wu et al. |
| 2017/0069214 | A1 | 3/2017 | Dupray et al. |
| 2018/0120829 | A1* | 5/2018 | Price .................. G05D 1/0022 |

* cited by examiner

DIRECT-BROADCAST REMOTE IDENTIFICATION (RID) DEVICE FOR UNMANNED AIRCRAFT SYSTEMS (UAS)

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

The instant application claims priority as a continuation-in-part of U.S. Non-Provisional patent application entitled SYSTEMS AND METHODS FOR REGULATING THE LOCATION OF AN UNMANNED AERIAL SYSTEM (UAS), naming Paul Beard as an inventor, filed Oct. 11, 2016, application Ser. No. 15/290,790.

The said application Ser. No. 15/290,790 in turn claims priority to:

U.S. Provisional Patent Application entitled SYSTEMS AND METHODS FOR LOCATION GUIDANCE OF AN UNMANNED AERIAL SYSTEM (UAS), naming Paul Beard as an inventor, filed Sep. 16, 2016, application Ser. No. 62/395,900;

U.S. Provisional Patent Application entitled SYSTEMS AND METHODS FOR LOCATION GUIDANCE OF AN UNMANNED AERIAL SYSTEM (UAS), naming Paul Beard as an inventor, filed Sep. 6, 2016, application Ser. No. 62/384,007;

and U.S. Provisional Patent Application entitled SYSTEMS AND METHODS FOR LOCATION GUIDANCE OF AN UNMANNED AERIAL SYSTEM (UAS), naming Paul Beard as an inventor, filed Oct. 15, 2015, application Ser. No. 62/242,182.

The instant application claims priority as a continuation-in-part of U.S. Non-Provisional patent application entitled SYSTEM AND APPARATUS FOR TRANSPONDER ASSISTED DETECTION AND RANGING (TADAR), naming Paul Beard as an inventor, filed Oct. 11, 2016, application Ser. No. 15/290,760.

The said application Ser. No. 15/290,760 in turn claims priority to U.S. Provisional Patent Application entitled TRANSPONDER ASSISTED DETECTION AND RANGING (TADAR) SYSTEM AND APPARATUS, naming Paul Beard as an inventor, filed Oct. 8, 2015, application Ser. No. 62/239,016.

The instant application claims priority as a continuation-in-part of U.S. Non-Provisional patent application entitled AUTOMATIC DEPENDENT SURVEILLANCE-BROADCAST (ADS-B) TRANSMISSION WITHIN WHITESPACE, naming Paul Beard as an inventor, filed Aug. 24, 2016, application Ser. No. 15/246,095.

The said application Ser. No. 15/246,095 in turn claims priority to:

U.S. Provisional Patent Application entitled NETWORK CONNECTIVITY AND PRECISE DELIVERY LOCATION FOR AUTONOMOUS UNMANNED VEHICLES, naming Paul Beard as an inventor, filed Aug. 27, 2015, application Ser. No. 62/210,494; and U.S. Provisional Patent Application entitled AUTOMATIC DEPENDENT SURVEILLANCE BROADCAST TRANSMISSION WITHIN WHITESPACE, naming Paul Beard as an inventor, filed Aug. 24, 2015, application Ser. No. 62/209,221.

The instant application claims priority to U.S. Provisional Patent Application entitled REMOTE IDENTIFICATION, naming Paul Beard as an inventor, filed Mar. 31, 2017, Application Ser. No. 62/480,031.

Said U.S. patent application Ser. Nos. 15/290,790; 15/290,760; 15/246,095; 62/480,031; 62/395,900; 62/384,007; 62/242,182; 62/239,016; 62/210,494; and 62/209,221 are herein incorporated by reference in their entirety.

TECHNICAL FIELD

The present invention generally relates to direct-broadcast position reporting devices for unmanned aircraft systems (UAS).

BACKGROUND

Regulating the operations of drones, rotorcraft, multicopters, and other unmanned aircraft systems (UAS; also small UAS, or sUAS) is a puzzle that has yet to be completely solved at the federal level, even while states and municipalities attempt to devise and impose their own rules. This puzzle has many pieces; for example, flights over people, extended beyond visual line of sight (BVLOS) operations, and remote identification of UAS. Remote identification, or RID, means that local and ground-level law enforcement officials (LEO) and first responders encountering a UAS will want to know, first and foremost, two things. First, who is it; in other words, who is the owner or operator of the UAS in question? Second, are they allowed to be here; does the owner/operator of this UAS have permission or authorization to operate the UAS in a particular airspace?

RID may assist LEOs in their investigations by, for example, providing eyewitnesses a means of positively identifying a UAS, in the same manner that a tail number may uniquely identify a manned aircraft. Further, RID solutions may aid UAS operators in providing separation assurance (e.g., detect-and-avoid) between their own UAS and other nearby UAS, or between the UAS and manned aircraft who might not otherwise be able to "see" them. For example, UAS traffic does not yet fit into next-generation surveillance radar systems such as Automatic Dependent Surveillance-Broadcast (ADS-B), leaving visual recognition as the only means for pilots to identify most UAS—a means which is often unreliable due to the small size of many civilian UAS.

To be widely deployable, any UAS-based RID solution must take into consideration the potential for spectrum congestion, either at manned aircraft frequencies (e.g., specific frequencies allotted for next-generation ADS-B communications between aircraft) or among high density UAS traffic, and adverse effect on overall system performance. Further, any solution should consider the size, weight, power consumption, and cost (SWaP-C) considerations of sUAS mobile platforms, as well as the convenience of integrating or retrofitting RID solutions as aftermarket components. The smaller the UAS targeted and included, the more UAS overall are able to participate. Finally, RID solutions remain functional within internet-denied areas.

SUMMARY

In one aspect, embodiments of the inventive concepts disclosed herein are directed to a direct-broadcast remote identification (RID) apparatus attachable to an unmanned aircraft system (UAS). The apparatus includes a GPS receiver (which may or may not be ADS-B certified) for determining a launch position of the UAS and for updating its current position, and a barometer for determining the height of the UAS above ground (e.g., for differentiating between launch and inflight positions). An onboard memory stores configuration data, such as the launch position and a unique identifier code or address corresponding to the UAS. The apparatus includes an RF transceiver incorporating processors and a low-power transmitter (e.g., transmission power generally no more than 1.0 to 4.0 watts, depending on the transmitting frequency) for encoding the configuration data (e.g., the identifier, launch position, and last current position) into identifier signals transmitted at low power at radio control (RC) frequencies, Automated Dependent Surveillance-Broadcast (ADS-B) frequencies, Distance Measuring Equipment (DME) frequencies, television whitespace frequencies, and selected industrial/scientific/medical (ISM) frequencies as needed.

In a further aspect, embodiments of the inventive concepts disclosed herein are directed to a remote identification (RID) receiver device capable of being carried by authorized law enforcement or security personnel. The receiver device includes an RF receiver incorporating processors for receiving and decoding identifier signals transmitted by RID devices aboard nearby UAS. By decoding the identifier signals, the receiver identifies and positions the nearby UAS, displaying the identifier and position information to the user via a screen or like means of display (e.g., via mapping the transmitting UAS relative to the user). The receiver device includes a memory for storing the decoded identifier and position data along with displayable maps (for use in standalone mode, e.g., within internet denied areas) and cryptographic keys for verifying digital signatures encoded into the identifier signals (e.g., verifying the identity of a transmitting UAS). The receiver device may also establish wireless links to remote databases to retrieve additional information about nearby UAS based on the decoded identifier and position data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
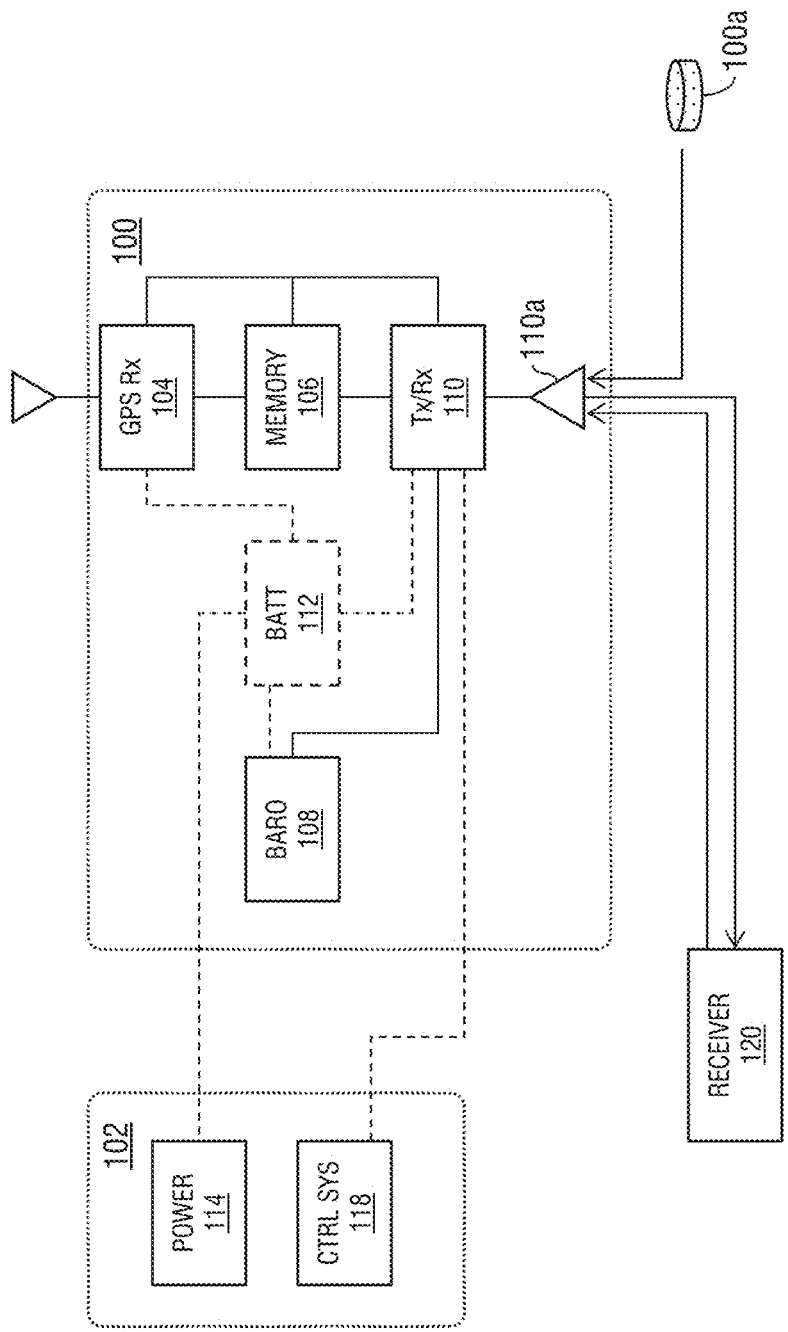
FIG. 1 is a diagrammatic illustration of an exemplary embodiment of a remote identification (RID) device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to ultracompact direct-broadcast Remote Identification (RID) devices compatible with a broad variety of unmanned aircraft systems (UAS). The RID devices broadcast identifier signals providing the identity and position of a UAS to which the device is attached. Authorized personnel may utilize specially configured receiver devices to receive and decode the identifier signals, even in internet-denied areas, and may thereby determine whether a given UAS is authorized to be in or over a given location. The RID devices may be self-contained "stick-on" devices deployable with minimal reconfiguration; alternatively, an RID device may be directly integrated into onboard systems of the UAS for enhanced functionality.

Referring to FIG. 1, an exemplary embodiment of a direct-broadcast RID device 100 attachable and connectible to a UAS 102 may include a position receiver 104 (e.g., a certified Global Positioning System (GPS) or other like satellite-based positioning receiver), an onboard memory 106 or other similar means of data storage, an integrated barometer 108, and a radio frequency (RF) transceiver 110 (which may include antenna elements 110a). The RID device 100 may be a "stick-on" device attachable directly to a surface of the UAS 102 without the need for further connection, and include a battery (112) or similar self-contained power source. In some embodiments, the RID device 100 may, in addition to physically attaching to the UAS 102, connect to a power source (114) of the UAS in order to provide power to the RID device 100 and its components (e.g., via an auxiliary power outlet). It is contemplated that the RID device 100 will require significantly less power than an LTE modem (e.g., 90 milliamperes (mA) vs. 500 mA), so directly connecting the RID device to a UAS power source 114 would have a negligible effect on flight time while eliminating the added weight of a battery 112. The RID device 100 may directly integrate with a control system (118) or autopilot system of the UAS 102 (e.g., via MAVLink or any appropriate similar physical interface) for added functionality.

The position receiver 104 may determine a launch position of the UAS 102 and track the position of the UAS inflight (e.g., in conjunction with the barometer 108 for determining the height of the UAS above its launch point), storing the launch position to memory (106). The launch position, e.g., a static position of a remote user or operator of the UAS, may be encoded into direct-broadcast transmissions as an identifier of the UAS 102 or of the operator.

The transceiver 110 may include processors (e.g., a field programmable gate array (FPGA), application specific integrated circuit (ASIC), or the like) for encoding direct-broadcast identifier signals based on the current position of the UAS 102 and identification data stored to memory (106) when the RID device 100 is configured for use with a particular UAS. The stored identification data, analogous to a tail number, N-number or International Civil Aviation Organization (ICAO) address for manned aircraft, uniquely identifies the UAS 102 to any receivers (120) equipped to receive and decode transmitted identifier signals. In addition to identifier and position data, the identifier signal may include operating status data for a UAS 102 to which the RID device 100 is directly integrated, e.g., the current power or battery level or the current status of one or more components of the UAV 102 or of the RID device 100 (e.g., active/inactive/damaged).

It is contemplated that identifier signals encoded and transmitted by the transceiver 110 are compliant with requirements recommended by the UAS Identification and Tracking (UAS ID) Aviation Rulemaking Committee chartered by the Federal Aviation Administration (FAA). The identifier signals may be encoded and transmitted by the transceiver 110 at intervals, such that identification data is available to authorized receivers (120) in near real time. For example, the transceiver 110 may encode the identification data, the most recent current position of the UAS 102, and the launch position of the UAS 102 into a predetermined message format and transmit the resulting identifier signal every two seconds at low power (e.g., under 1 watt). The RID device 100 may transmit at low power in order to preserve spectrum capacity and avoid system degradation under high sUAS traffic volumes. The maximum transmission power may be adjusted, e.g., by a remote operator, depending on the operating parameters. For example, a 10 milliwatt (mW) transmission may have an effective range of 0.5 miles within line of sight (LOS); a 100 mW transmission, 4 miles; and a 500 mW transmission, 10 miles).

The RID device 100 may be capable of transmitting in a variety of frequency bands depending upon requirements. For example, the RID device 100 may transmit at ADS-B frequencies, enabling communication with manned aircraft within the ADS-B network. However, under some conditions, UAS saturation of the protected aviation spectrum may lead regulators to require that UAS direct-broadcast transmissions occur at other frequencies.

For example, the transceiver 110 may transmit at one or more selected frequencies within any of the following frequency ranges:

(1) Designated ADS-B frequencies, e.g., 978 MHz (Universal Access Transceiver, or UAT), 1090 MHz (Extended Squitter, or ES), and 1104 MHz. It is contemplated that low-power transmissions (e.g., 10-100 mW) within the ADS-B spectrum may provide electronic "visibility" between unmanned and manned aircraft at a range of up to 5 miles without overloading the spectrum capacity.

(2) Frequencies commonly associated with radio-controlled (RC) vehicles and other similar devices, e.g., the high end of the high frequency (HF) band (26.5 to 30 MHz) and RC frequencies within the TV whitespace band (72 to 76 MHz).

(3) "Whitespace" frequencies formerly associated with North American terrestrial television broadcasts, e.g., very high frequency (VHF) low-band frequencies between 54 to 88 MHz (excluding the above-mentioned 72-76 MHz RC band), or the former terrestrial channels 2 through 6; VHF high-band frequencies between 174 and 216 MHz, or the former terrestrial channels 7 through 13; and ultra high frequency (UHF) band frequencies between 470 and 890 MHz, or the former terrestrial channels 13 through 83. It is noted that an RID device 100 configured for transmission at whitespace frequencies may further be configured to "frequency hop" based on its geographical position, as the assignment of whitespace frequencies may vary on a localized basis.

(4) Distance measuring equipment (DME) or aeronautical radio navigation frequencies between 960 and 1215 MHz (excluding above-mentioned ADS-B frequencies). It is noted that repurposing of DME frequencies for UAS surveillance would enable these frequencies to remain under the aegis of the FAA with respect to infringement enforcement.

(5) Selected frequencies within the United States industrial, scientific, and medical (ISM) radio bands, e.g., 315 MHz, 433 MHz, and 915 MHz (generally associated with garage-door openers, keyless entry systems, and cordless landline telephones respectively).

The transmitting power of the transceiver 110 may selectably vary depending upon the transmitting frequencies for which the transceiver is configured. For example, the low power transmissions described above (e.g., under 1 watt) may be possible at whitespace or RC frequencies, or for low-power ADS-B transmissions. However, transmissions at ISM-band frequencies may be associated with a transmission power of up to 4 W, while some ADS-B messages may be transmitted at 16 W or 70 W.

It is contemplated that the RID device 100 may include legacy receivers formerly configured to transmit at ADS-B frequencies repurposed, or retrofitted, to operate at other frequencies as described above. Furthermore, systems and unmanned vehicles as disclosed by co-pending application Ser. Nos. 15/246,095 and 15/290,790 may be repurposed or retrofitted to transmit at any of the additional frequencies described above.

A receiver 120 may be a portable communications or computing device (e.g., a smartphone or tablet) carried by authorized personnel (e.g., LEOs, first responders) and including hardware or software configured to receive and decode identifier signals transmitted by the transceiver 110, e.g., a tablet, smartphone, or specially programmed portable communications device.) Receiver devices 120 may be used to configure the RID device 100 for operation with a particular UAS 102. For example, the receiver device 120 may be programmed with an application for establishing a wireless connection to the transceiver 110 and thereby populating the onboard memory 106 with configuration data specific to the UAS 102 (e.g., a unique identifier corresponding to the UAS; emitter category and dimension data (length, width); a digital signature for verification of the UAS identity).

The receiver 120 may be a fixed-base device in addition to the portable device. Such a fixed-base device may provide a permanent installation for RID coverage in populated or high-traffic areas (e.g., sports venues) and interface with airspace awareness applications and/or surveillance radar systems, enabling manned and unmanned aircraft to "see" each other.

The transceiver 110 may further "listen" for other proximate UAS within range, receiving identifier signals transmitted by another RID device (100*a*) aboard the proximate UAS and relaying the received signals throughout the RID coverage area of the RID device 100. For example, the receiver device 120 may receive and decode the relayed identifier signal transmitted by the other RID device 100*a* and thereby identify and locate the associated UAS, increasing the effective range of the receiver device 120. In this way, RID devices 100, 100*a* may be strategically deployed in groups as an ad hoc mesh network of high-altitude receivers. Similarly, the memory 106 of the RID device 100 may serve as an ad hoc black box data recorder, storing data regarding the UAS 102 as well as other nearby UAS, based on received identifier signals. If, for example, said nearby UAS are damaged or destroyed, the memory 106 may yet provide useful and retrievable data relevant to the damaged or destroyed UAS.

Figure 2A:
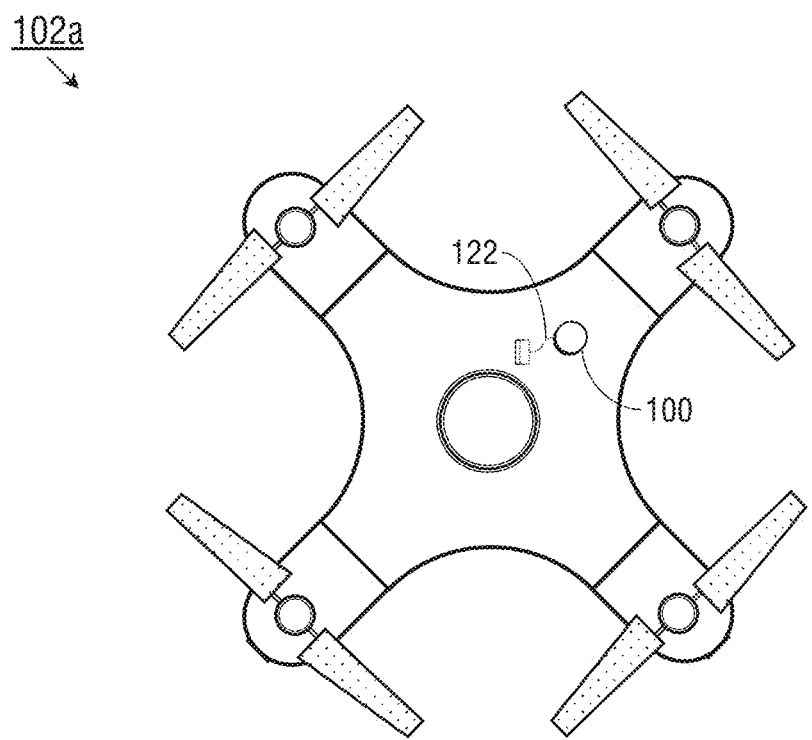
FIG. 2A is an overhead view of a unmanned aircraft system (UAS) incorporating the RID device of FIG. 1.
Figure 2B:
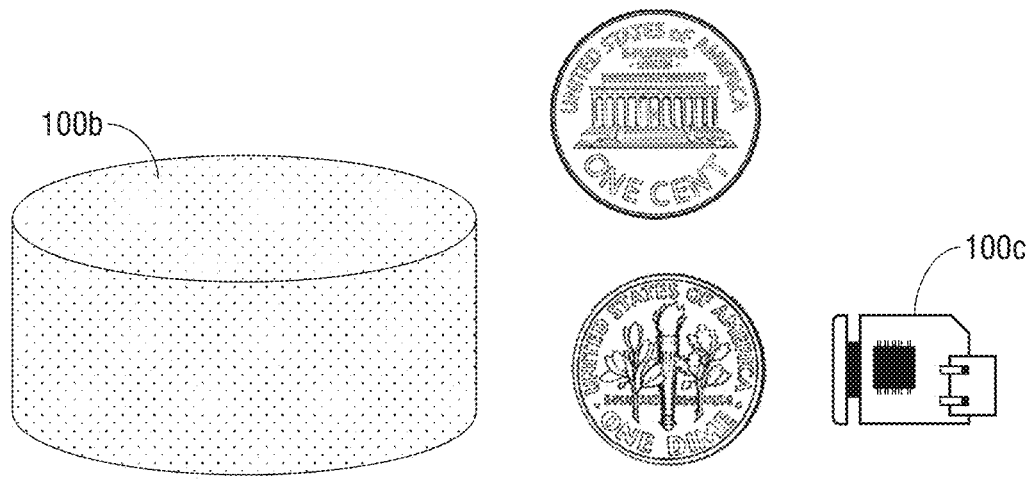
FIG. 2B illustrates the approximate size of the RID device of FIG. 1.

Referring to FIGS. 2A and 2B, the UAS 102*a* may be implemented and may function similarly to the UAS 102 of FIG. 1, except that the UAS 102*a* may be configured for use with the RID device 100 by attaching the RID device to the exterior surface of the UAS. It is contemplated that the RID device 100 may be consistent with SWaP-C considerations for the maximum possible number of sUAS. In other words, the RID device may be of a size, a cost, and an ease of configuration sufficient to support the broadest possible adoption and use of the RID device 100 among all sizes and classes of UAS 102*a*. For example, the RID device 100 may be a "stick-on" device attachable to the exterior of the UAS 102*a*, wherein the RID device components (e.g., the position receiver 104, memory 106, barometer 108, transceiver 110, and battery 112 (FIG. 1)) are self-contained and do not interact with the control systems (118, FIG. 1) of the UAS 102*a*. In some embodiments, the RID device 100 may directly integrate with the power source (114, FIG. 1) control systems 118 of the UAS 102*a* via a USB interface (122), MAVLink, or like physical interface. Referring also to FIG. 2B, the RID device 100*b* may be implemented and may function similarly to the RID device 100 of FIG. 2A, except that the RID device 100*b* may be compact enough for installation or attachment aboard the smallest and lightest classes of UAS without adversely affecting the weight or flight dynamics of said UAS. For example, in some embodiments the RID device 100*b* may have a diameter of 42 mm (~1.65 inches), a height of 18 mm (slightly less than the diameter of a United States cent (19 mm)), and a weight of 10 grams. The RID device 100*c* may be implemented and may function similarly to the RID device 100*b*, except that the RID device 100*c* may be physically integrated into the interior of the UAS 102*a* as a compact chip device (e.g., an FPGA, ASIC or the like) smaller than a United States dime (diameter ~18 mm).

Figure 3:
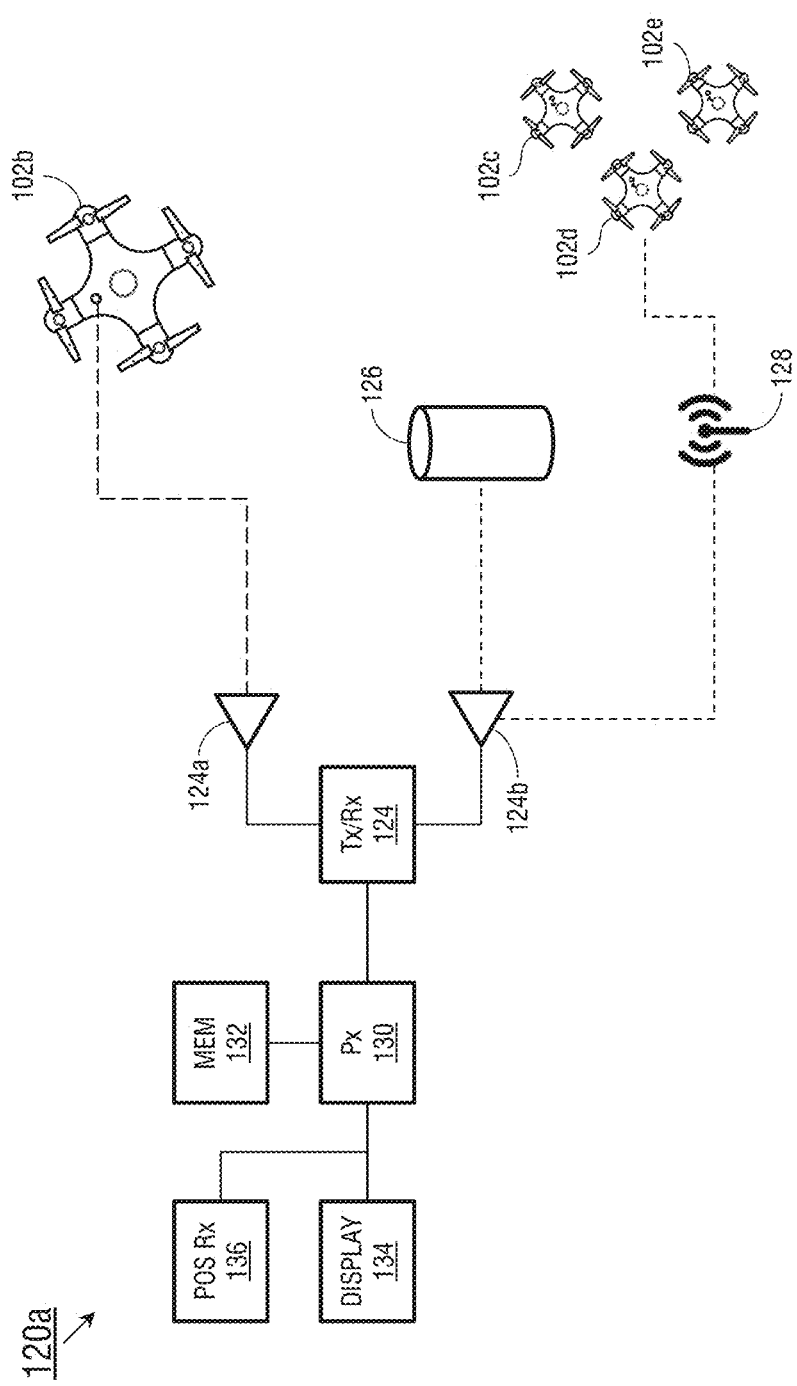
FIG. 3 is a diagrammatic illustration of the receiver device of FIG. 1.

Referring to FIG. 3, the receiver device 120*a* may be implemented and may function similarly to the receiver device 120 of FIG. 1, except that the receiver device 120*a* may incorporate a transceiver 124 having both RF components and antenna elements (124*a*) and a wireless interface (124*b*) for establishing wireless connections to databases (126) and wireless networks (128) located remotely from the receiver device. The receiver device 120*a* may include onboard processors (130) and memory (132) as well as a display surface (134) for displaying identifier and position data decoded from identifier signals transmitted by RID devices (100*a*) aboard a proximate UAS 102*b*. For example, the receiver device 120*a* may store to memory (132) displayable maps corresponding to an internet-denied region within which the receiver device 120*a* is currently located (and within which the receiver device, via its own onboard position receivers (136), can determine the location of the receiver device relative to one or more of the stored maps). The receiver device 120*a* may additionally store to memory (132) private keys associated with the UAS 102*b* in order to validate a digital signature transmitted via the identifier signal sent by the RID device 100*a*. If the receiver device 120*a* is in connected mode (e.g., in an internet-available area) the wireless interface 124*b* may connect the receiver device to the Internet, remote databases (126), or wireless networks (128) that may be tracking or monitoring other proximate UAS 102*c-e*. The receiver device 120*a* may download identifier and position data of the UAS 102*c-e* via the wireless interface 124*b*, tracking the UAS in addition to the proximate UAS 102*b* with which the receiver device is in direct RF communication.

Figure 4A:
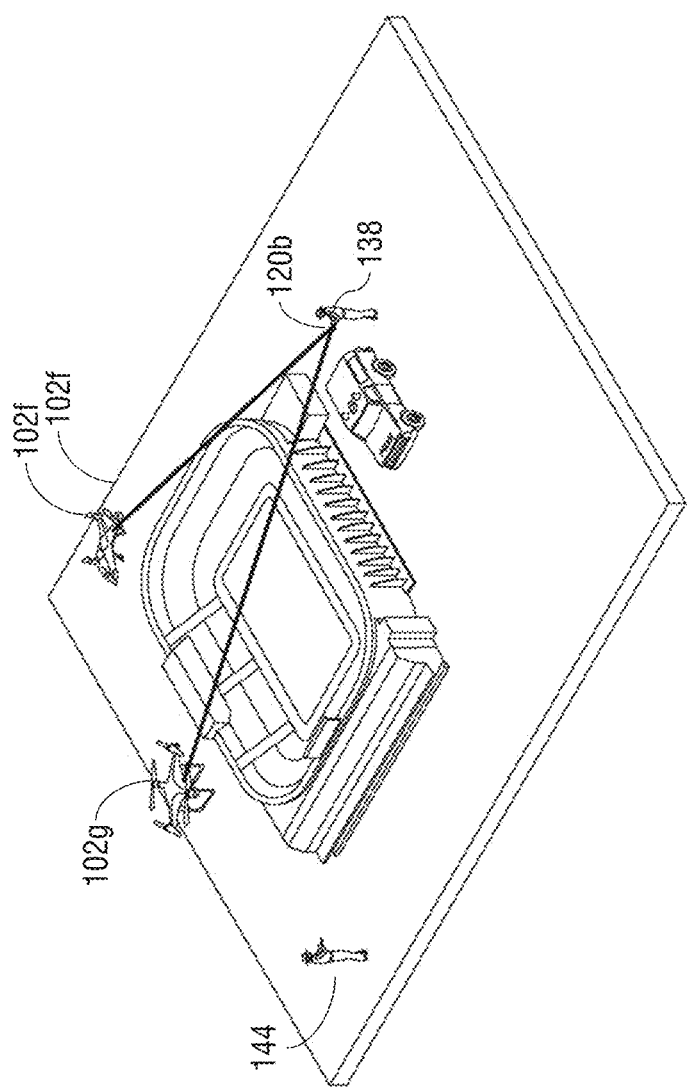
FIG. 4A illustrates operations of the RID device and receiver device of FIG. 1 in a standalone mode.
Figure 4B:
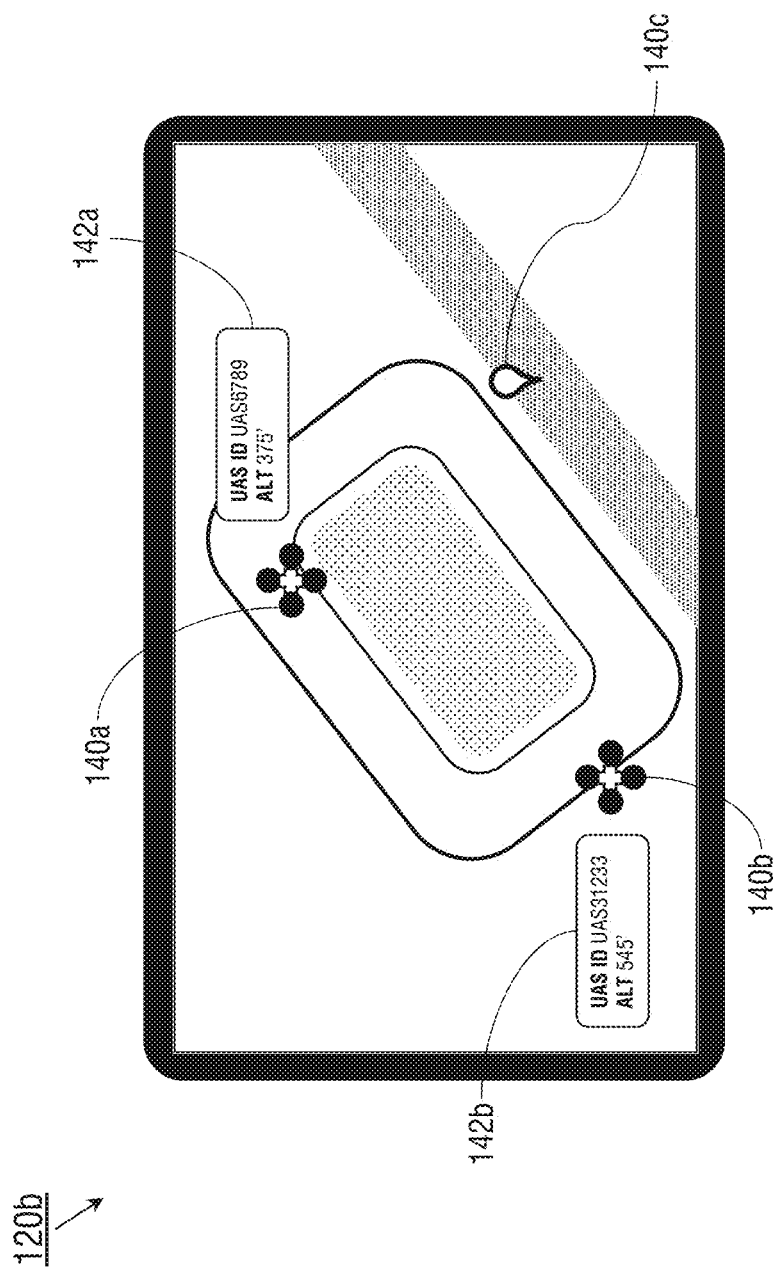
FIG. 4B illustrates the receiver device of FIG. 4A.

Referring to FIGS. 4A through 4B, the UAS 102*f* and 102*g* may be implemented and may function similarly to the UAS 102*a* of FIG. 2A, except that the UAS 102*f*-*g* may incorporate RID devices (100, FIG. 1) capable of operating in either standalone mode (compatible with internet and Long Term Evolution (LTE) denied environments) or connected mode (compatible with areas where the receiver 120 may establish connections to additional receivers, databases (126, FIG. 3), or wireless networks (128, FIG. 3) and access additional information therefrom.

The receiver device 120*b* may be implemented and may function similarly to the receiver device 120*a* of FIG. 3, except that the receiver device 120*b* (which may be carried by a user 138) may operate in standalone mode, e.g., when the receiver device 120*b* is within an internet-denied region. The receiver device 120*b* may, by decoding the received identifier signals, identify each UAS 102f-g and determine the latitude, longitude, and altitude of each UAS.

Referring to FIG. 4B, the receiver device 120b may display the decoded data to the user 138 by, for example, plotting the location (140a-b) of each identified UAS 102f-g relative to the location (140c) of the user as well as displaying the unique identifiers and altitude (142a-b) of each UAS. Accordingly, a receiver device 120b in standalone mode may decode a digital signature transmitted with the identifier signal, and verify the digital signature (and thus the identity of the UAS 102f-g) if the appropriate private keys are stored to memory (132, FIG. 3).

Referring back to FIG. 4A, the user 138 may be a law enforcement or public security professional authorized to access identifying and position data of the UAS 102f-g via the specially configured or programmed receiver device 120b. Other proximate individuals (144) may carry portable or mobile devices but may not be able to receive or decode identifier signals transmitted by the UAS 102f-g. However, these proximate individuals 144 may establish visual contact with the UAS 102f-g, reporting their observations and/or relative positions to control facilities and authorities and thus aiding in ongoing investigations.

Figure 5A:
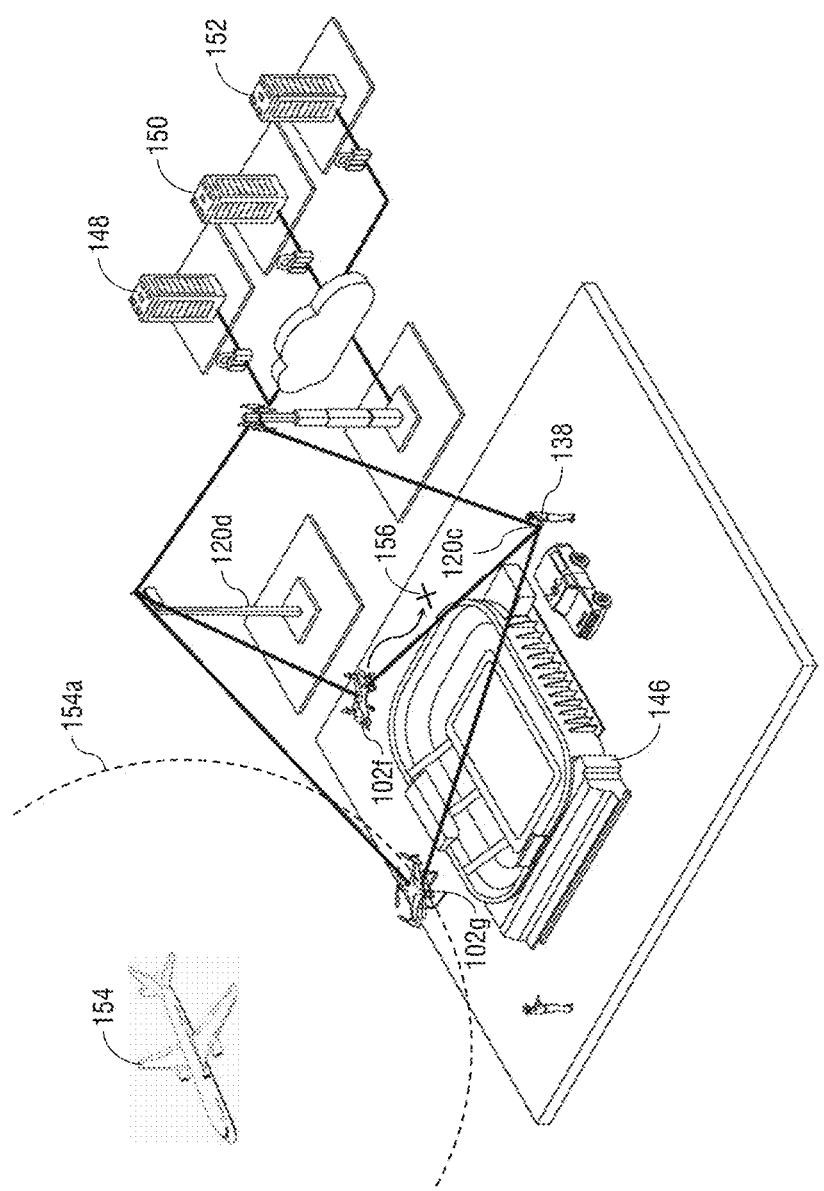
FIG. 5A illustrates operations of the RID device and receiver device of FIG. 1 in a connected mode.
Figure 5B:
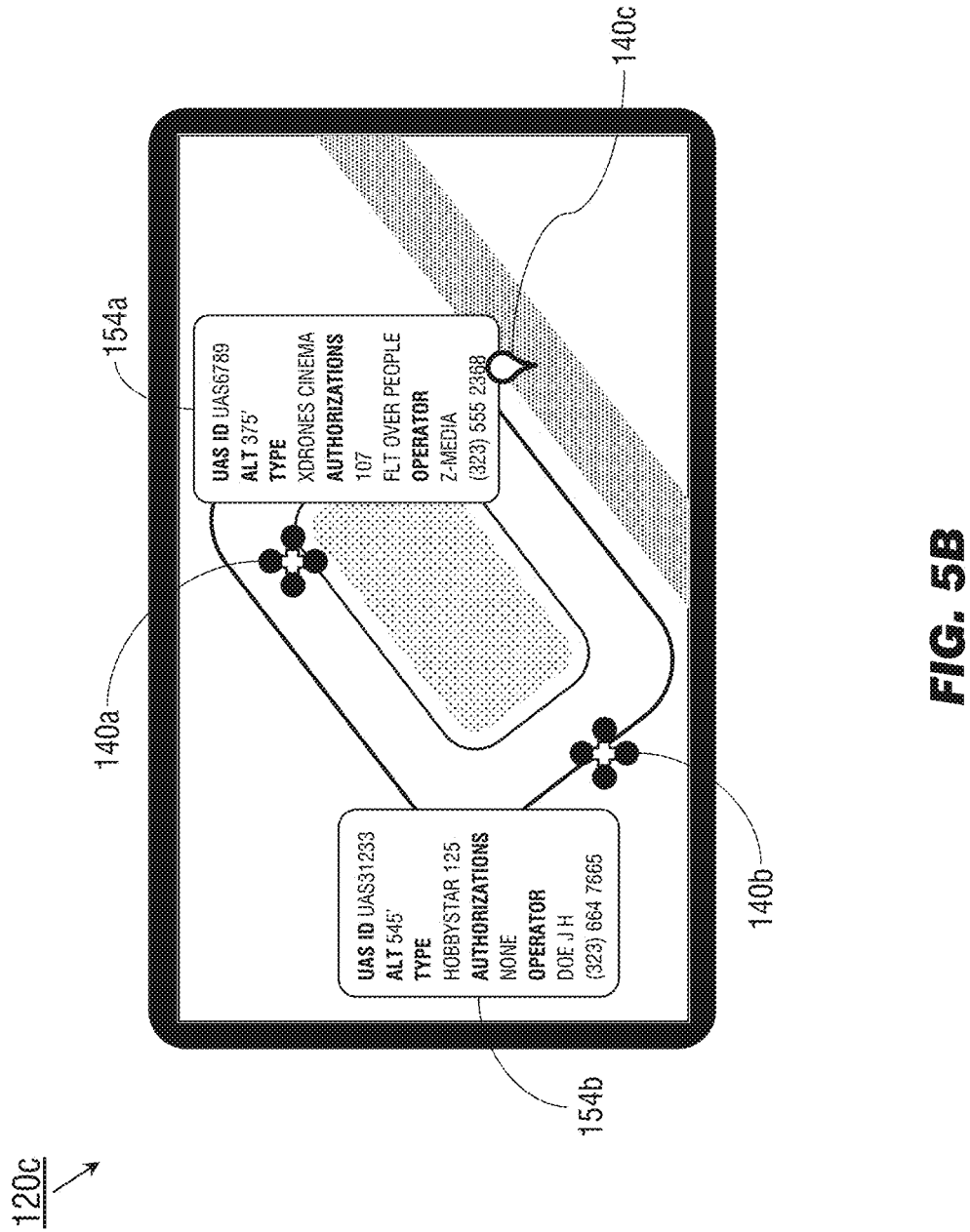
FIG. 5B illustrates the receiver device of FIG. 5A.

Referring to FIGS. 5A and 5B, the receiver device 120c may be implemented and may function similarly to the receiver device 120b of FIGS. 4A/B, except that the receiver device 120c may operate in connected mode (e.g., when the receiver device is within an internet-available environment). For example, the receiver device 120c may be a portable device carried by the user 138, while a networkable fixed-base receiver device 120d may provide permanent RID coverage for the venue 146 and its vicinity. The networkable fixed-base receiver device 120d may receive identifier signals from the RID devices aboard UAS 102f-g (as well as any other UAS within range). The wireless network 128a may be implemented and may function similarly to the wireless network 128 of FIG. 3, except that the wireless network 128a may allow the receiver device 120c, while in connected mode, to access additional information about the UAS 102f-g from the FAA registration database (148), unified threat management (UTM) providers (150; e.g., PrecisionHawk Low Altitude Tracking and Avoidance System (LATAS), AirMap DroneID), and security certificate databases (152). Referring in particular to FIG. 5B, the receiver device 120c may display to the user 138 (e.g., either as basic user information or on a prompted basis, wherein the user clicks or taps on basic user information for additional details) enhanced identifier data (154a-b) in addition to the plotted positions (140a-c) of the UAS 102f-g and the user 138. For example, based on the unique UAS identifier, the receiver device 120c may retrieve and display the make and model of the UAS 102f-g, any current authorizations, or the identity and contact information of the user or operator of the UAS. Referring back to FIG. 5A, the receiver device 120c may contact security certificate databases (152) to check, for example, Certificate Revocation Lists (CRL) to validate a security certificate transmitted via the identifier signals by the UAS 102f-g.

Referring in particular to FIG. 5A, an RID device (e.g., 100, FIG. 1) attached to, or integrated with, a UAS 102g may provide additional functionalities to the RID device or the receiver device 120c, some of which functionalities may be available only to directly integrated RID devices (e.g., 100c, FIG. 2B) and not to "stick-on" embodiments of the RID device (e.g., 100a, FIG. 2A). For example, in addition to relaying identifier signals from other RID devices (and other UAS) as described above, the RID device aboard the UAS 102g may "listen" for ADS-B Out transmissions from manned aircraft 154 (e.g., including identifier and position data of the transmitting aircraft). If the receiver device 120c determines (e.g., by decoding ADS-B Out transmissions) that the transmitting aircraft 154 is within a predetermined radius (154a; e.g., 3 nautical miles (NM)) of a reporting UAS 102f, the receiver device may direct the RID device aboard the proximate UAS 102f to transmit a low-power (e.g., 10-500 mW) "beacon" signal at an ADS-B frequency in order to alert the transmitting aircraft 154 to the presence of the proximate UAS.

Further, authorized security personnel may use the receiver device 120c to command a directly integrated RID device 100c (e.g., aboard the UAS 102f) to perform various functions. For example, the FAA may mandate "hooks" into UAS/sUAS autopilot systems responsive to remote commands which cannot be overridden by the operator. The user 138 (or an authorized individual in possession of the receiver device 120c) may remotely transmit commands to the control system (118, FIG. 1) of the UAS 102f, directing the UAS to, e.g., land immediately (156); return home, or to its stored launch position; or orbit/hover in place until otherwise instructed. The receiver device 120c may order the UAS 102f to proceed to a designated waypoint (the transmission including an encoded go-to location) or transmit a kill-switch to immediately deactivate the UAS 102f. The directly integrated RID device 100c may acknowledge receipt of said remote commands to the user 138 on behalf of the control system 118.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A direct-broadcast remote-identification (RID) apparatus attachable to an unmanned aircraft system (UAS), comprising:
 a position receiver configured to:
  1) receive one or more satellite-based position signals via at least one antenna element;
   and
  2) determine, based on the received position signals and an altitude of the UAS, one or more of a) a launch position corresponding to a launch point of a UAS and b) a current position of the UAS;
 a barometer configured to determine the altitude of the UAS;
 a memory coupled to the position receiver and capable of storing configuration data, the configuration data including a unique identifier corresponding to the UAS; and
 a transceiver coupled to the position receiver and the memory, the transceiver including one or more processors and a radio frequency (RF) transmitter configured to:
  1) encode at least one identifier signal based on one or more of the launch position, the current position, and the configuration data; and
  2) transmit the at least one encoded identifier signal at one or more operating frequencies.

2. The direct-broadcast RID apparatus of claim 1, wherein:
the RF transmitter has a transmission power output of not more than 1 watt;
and
the RF transmitter is configured to transmit the at least one encoded identifier signal at one or more operating frequencies including at least one of:
1) a radio control (RC) frequency including a frequency of at least 26.5 MHz and not more than 30 MHz, 72 MHz, and 75 MHz;
2) an Automated Dependent Surveillance-Broadcast (ADS-B) frequency including at least one of 978 MHz, 1090 MHz, and 1104 MHz;
3) a Distance Measuring Equipment (DME) frequency including at least one frequency of at least 960 MHz and not more than 1215 MHz, excluding the at least one ADS-B frequency;
and
4) a television whitespace (TVWS) frequency including at least one of:
a) a VHF low band frequency of at least 54 MHz and not more than 88 MHz;
b) a VHF high band frequency of at least 174 MHz and not more than 216 MHz;
and
c) a UHF band frequency of at least 470 MHz and not more than 890 MHz.

3. The direct-broadcast RID apparatus of claim 1, wherein:
the RF transmitter has a transmission a power output of not more than 4 watts;
and
the RF transmitter is configured to transmit the at least one encoded identifier signal at one or more legacy industrial/scientific/medical (ISM) frequencies including at least one of 315 MHz, 433 MHz, and 915 MHz.

4. The direct-broadcast RID apparatus of claim 1, wherein the direct-broadcast RID apparatus is removably attachable to the UAS, further comprising:
at least one battery configured to supply power to one or more of the position receiver and the transceiver.

5. The direct-broadcast RID apparatus of claim 1, wherein the direct-broadcast RID apparatus is connectible to the UAS via one or more of:
a power connection coupling the apparatus to a power source of the UAS and configured to draw operating power therefrom;
and
a command connection coupling the transceiver to a control system of the UAS.

6. The direct-broadcast RID apparatus of claim 5, wherein the transceiver is configured to:
receive at least one remote command transmitted by an authority located remotely from the UAS;
and
forward the at least one received remote command to the control system via the command connection.

7. The direct-broadcast RID apparatus of claim 6, wherein the remote command includes at least one of:
a land-now order;
a return-to-base order associated with the launch position;
a hover order;
a kill switch order configured to deactivate the UAS;
and
a proceed-to order including a destination location.

8. The direct-broadcast RID apparatus of claim 5, wherein the transceiver is configured to encode the identifier signal based on an operating status of the UAS, the operating status including one or more of a power level and a component status.

9. The direct-broadcast RID apparatus of claim 1, wherein the configuration data includes one or more of a digital signature and a security certificate, the digital signature and the security certificate corresponding to at least one of the UAS and an operator of the UAS.

10. The direct-broadcast RID apparatus of claim 1, wherein the at least one identifier signal is a first identifier signal and the transceiver is configured to:
receive at least one second identifier signal corresponding to a proximate aircraft;
and
transmit the at least one received second identifier signal at the one or more operating frequencies.

11. The direct-broadcast RID apparatus of claim 10, wherein the transceiver is configured to:
determine a distance between the current position and the proximate aircraft by decoding the received second identifier signal;
and
while the determined distance is within a predetermined radius, transmit the at least one first identifier signal at a predetermined interval.

* * * * *